(12) United States Patent
Pintzos (10) Patent No.: US 11,919,184 B2
(45) Date of Patent: Mar. 5, 2024

(54) APPARATUS FOR ASSESSING THE CONDITION OF A SHAVING RAZOR CARTRIDGE

(71) Applicant: BIC VIOLEX S.A., Anoixi (GR)

(72) Inventor: Georgios Pintzos, Attica (GR)

(73) Assignee: BIC Violex Single Member S.A., Anoixi (GR)

(*) Notice: Subject to any disclaimer, the term of this patent is extended or adjusted under 35 U.S.C. 154(b) by 534 days.

(21) Appl. No.: 16/973,799

(22) PCT Filed: Jul. 31, 2019

(86) PCT No.: PCT/EP2019/070695
§ 371 (c)(1),
(2) Date: Dec. 10, 2020

(87) PCT Pub. No.: WO2020/025705
PCT Pub. Date: Feb. 6, 2020

(65) Prior Publication Data
US 2021/0122071 A1 Apr. 29, 2021

Related U.S. Application Data

(60) Provisional application No. 62/712,296, filed on Jul. 31, 2018.

(51) Int. Cl.
*B26B 21/40* (2006.01)
*A45D 27/29* (2006.01)
(Continued)

(52) U.S. Cl.
CPC .......... *B26B 21/4056* (2013.01); *A45D 27/29* (2013.01); *B26B 21/4087* (2013.01);
(Continued)

(58) Field of Classification Search
CPC ... B26B 21/4056; B26B 21/4087; H04B 1/38; G08B 21/182; G08B 3/10; G08B 5/36;
(Continued)

(56) References Cited

U.S. PATENT DOCUMENTS 9,174,351 B2 11/2015 Binder
2002/0189102 A1* 12/2002 Orloff ................. B26B 21/4087
30/41.7
(Continued)

FOREIGN PATENT DOCUMENTS

| CN | 1207335 A | 2/1999 |
| CN | 103889667 A | 6/2014 |

(Continued)

OTHER PUBLICATIONS

International Search Report and Written Opinion in International Application No. PCT/EP2019/070695, dated Oct. 25, 2019 (12 pages).

*Primary Examiner* — Ghassem Alie
(74) *Attorney, Agent, or Firm* — Bookoff McAndrews, PLLC (57) ABSTRACT

A shaving razor has a cartridge containing one or more blades. A base unit supports the shaving razor and has one or more sensors, a processor, and circuitry configured to determine accumulation of debris in the cartridge and/or wear of the blades. The base unit directly, or indirectly via a handheld personal computer, provides a visual or aural alert to the user regarding the accumulation of debris in the cartridge and/or wear of the blades.

17 Claims, 7 Drawing Sheets

(51) Int. Cl.
*G01N 21/55* (2014.01)
*G01N 21/94* (2006.01)
*G01N 21/95* (2006.01)
*G06Q 30/0601* (2023.01)
*G06T 7/00* (2017.01)
*G08B 21/18* (2006.01)
*G16Y 10/45* (2020.01)
*H04B 1/38* (2015.01)
*H04L 12/66* (2006.01)
*B26B 21/22* (2006.01)
*G08B 3/10* (2006.01)
*G08B 5/36* (2006.01)

(52) U.S. Cl.
CPC ............ *G01N 21/55* (2013.01); *G01N 21/94* (2013.01); *G01N 21/95* (2013.01); *G06Q 30/0641* (2013.01); *G06T 7/0002* (2013.01); *G08B 21/182* (2013.01); *G16Y 10/45* (2020.01); *H04B 1/38* (2013.01); *H04L 12/66* (2013.01); *B26B 21/222* (2013.01); *G08B 3/10* (2013.01); *G08B 5/36* (2013.01)

(58) Field of Classification Search
CPC ........ G16Y 10/45; G01N 21/95; G01N 21/94; G01N 21/55; H04L 12/66; G06Q 30/0641; G06T 7/0002; B16B 21/222

USPC ...................... 30/41.7, 34.05, 526, 537, 541
See application file for complete search history.

(56) References Cited

U.S. PATENT DOCUMENTS

| | | | |
|---|---|---|---|
| 2007/0220754 | A1 | 9/2007 | Barbaro et al. |
| 2009/0056141 | A1* | 3/2009 | Barry ...................... B26B 21/40 30/41.7 |
| 2014/0137883 | A1 | 5/2014 | Rothschild |
| 2014/0208601 | A1* | 7/2014 | Battin .................... A45D 27/46 30/538 |
| 2015/0051845 | A1* | 2/2015 | Alhashemi .......... B26B 21/4056 702/34 |
| 2017/0232624 | A1* | 8/2017 | King ....................... G01K 1/14 30/34.05 |

FOREIGN PATENT DOCUMENTS

| | | |
|---|---|---|
| CN | 105014481 A | 11/2015 |
| EP | 0550835 A1 | 7/1993 |
| EP | 0895835 A2 | 2/1999 |
| EP | 1279351 A1 | 1/2003 |
| WO | 2009076301 A2 | 6/2009 |
| WO | 2015067634 A1 | 5/2015 |
| WO | 2017012969 A1 | 1/2017 |

* cited by examiner

FIG.6
Darker colored object reflects less IR light

FIG.5
Lighter colored object reflects more IR light

APPARATUS FOR ASSESSING THE CONDITION OF A SHAVING RAZOR CARTRIDGE

CROSS REFERENCE TO RELATED APPLICATIONS

This application is a National Stage Application of International Application No. PCT/EP2019/070695, filed on Jul. 31, 2019, now published as WO/2020/025705 and which claims priority to U.S. Patent Application 62/712,296 filed on Jul. 31, 2018.

BACKGROUND

1. Field

The present disclosure relates to assessing the condition of a shaving razor cartridge. More particularly, the present disclosure relates to a system and method for determining the condition of a cartridge and alerting the user.

2. Description of Related Art

Shaving razors having one or more blades are used to trim body and facial hairs. After time or with use debris can accumulate and the blades can dull, thereby diminishing effectiveness.

SUMMARY

The system and method of the present disclosure provides users of a shaving razor feedback regarding in one aspect the condition of the blades (i.e. an amount of wear or dullness), and/or in another aspect, the condition of the cartridge (i.e. an amount of clogging of hair, skin and/or other debris) to improve the shaving experience.

The system and method of the present disclosure functions on the principle of object detection using an IR sensor and imaging techniques to assess debris accumulation and blade wear in a razor cartridge so that a user can be notified to rinse or replace the razor cartridge.

The present disclosure also provides a shaving system or apparatus for a razor with a sensor or camera to assess debris accumulation and/or blade wear in a razor cartridge so that a user can be notified to rinse or replace the razor cartridge.

The present disclosure further provides a shaving system or apparatus for a razor that can be communicatively connected to a vendor platform via an Internet-of-Things (IoT) gateway to assist the user in determining whether new razor cartridges should be ordered and/or for ordering new razor cartridges.

The present disclosure still further provides a shaving system or apparatus for a razor that can be communicatively connected to a handheld personal computer or computer with an app or web app to assist the user in determining whether new razor cartridges should be ordered and/or for ordering new razor cartridges.

The above summary is not intended to describe each disclosed implementation, as features in this disclosure can be incorporated into additional features as detailed herein below unless clearly stated to the contrary.

BRIEF DESCRIPTION OF THE DRAWINGS

The accompanying drawings illustrate aspects of the present disclosure, and together with the general description given above and the detailed description given below, explain the principles of the present disclosure. As shown throughout the drawings, like reference numerals designate like or corresponding parts.

DETAILED DESCRIPTION

Referring to the drawings and, in particular to FIG. 1, a shaver system for assessing and alerting a user of debris accumulation and/or blade wear in a razor cartridge is shown and generally represented by reference numeral 10, hereinafter "shaver system".

Debris can include, for example, hair, skin, makeup, soap, and dirt. Blade wear can include, for example edge retention, misalignment, corrosion, deformities, and chips.

Shaver system 10 includes a razor 100 that has an elongate handle 110 for grasping by a user and a cartridge 120 for housing the one or more blades 24. Shaver system 10 also includes a separate base unit 20 that has a sensing unit 210 that detects debris accumulation and blade wear of cartridge 120. Base unit 20 also has circuitry 200 for effecting the detection of debris accumulation and blade wear. In certain aspects, base unit 20 is also a cradle for razor 100.

As will be discussed, shaver system 10 informs a user via signals such as (i) a light indication (e.g., using different colored LED lights) and/or (ii) an aural indication (e.g., using different sound levels and/or patterns) on base unit 20 or a smartphone app when: (i) cartridge 120 needs to be rinsed or rinsed better, or (ii) blades 24 are dull and the cartridge needs to be replaced.

Accordingly, a user will not only have a better shaving experience but will also be afforded a financial benefit since the user will only change the cartridge when needed and not sooner.

Figure 2:
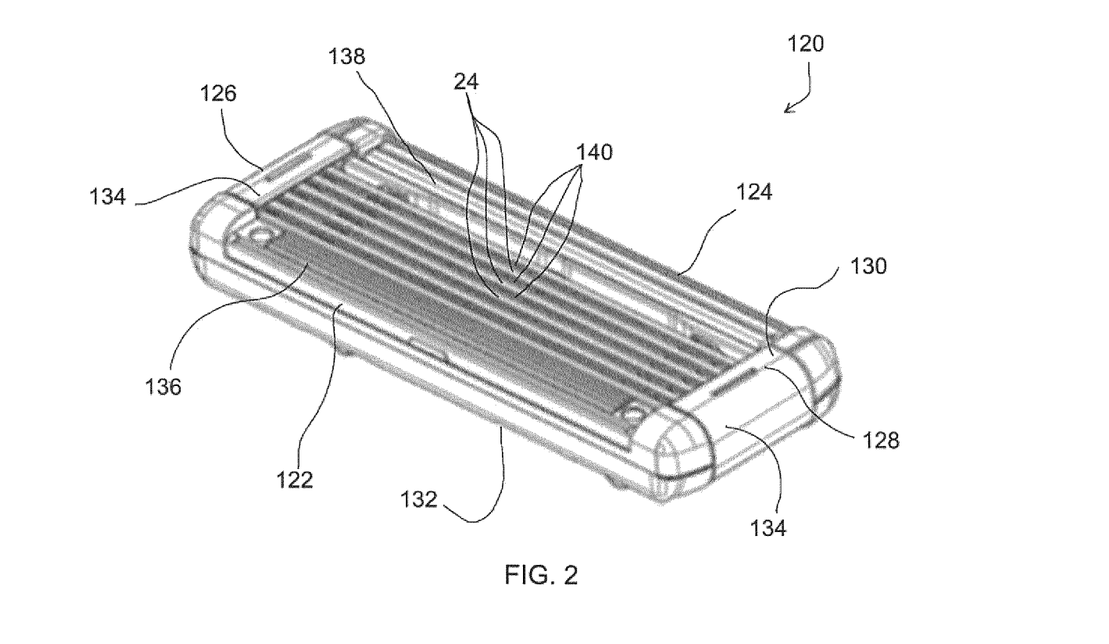
FIG. 2 is a perspective view of a cartridge for the razor.

Referring to FIG. 2, cartridge 120 has a front edge 122, a rear edge 124, a pair of side edges 126, 128, a top surface 130, and a bottom surface 132. Top surface 130 is a skin contacting or skin engaging surface. The pair of side edges 126, 128 extend between front edge 122 and rear edge 124. Shaving cartridge 120 includes a guard bar 136 adjacent to front edge 122 of the housing and a cap 138 adjacent to rear edge 124. A lubricating strip can be provided on a surface of cap 138.

Blades 24 (shown in FIG. 1) are secured in cartridge 120 between side edges 126 and 128 and between guard bar 136 and cap 138 by one or more retaining elements 134 such as, in certain aspects, a pair of retainers or retaining clips. Between each blade 24 is a gap or space 140.

Although shaving cartridge 120 is shown with five blades 24 retained in position in cartridge 120 using a pair of retaining elements 134, any number of blades 24 including one blade can be used and any number and/or type of retaining element 134 can be provided at one or more suitable locations to retain the blades 24 in position.

In some embodiments, sensing unit 210, such as an IR light sensor of the type described in connection with FIGS. 3 to 6, is disposed in base unit 20 so that sensing unit 210 faces top surface 130 when razor 100 is positioned on or operatively connected to base unit 20.

Sensing unit 210 and top surface 130 are spaced apart.

Figure 1:
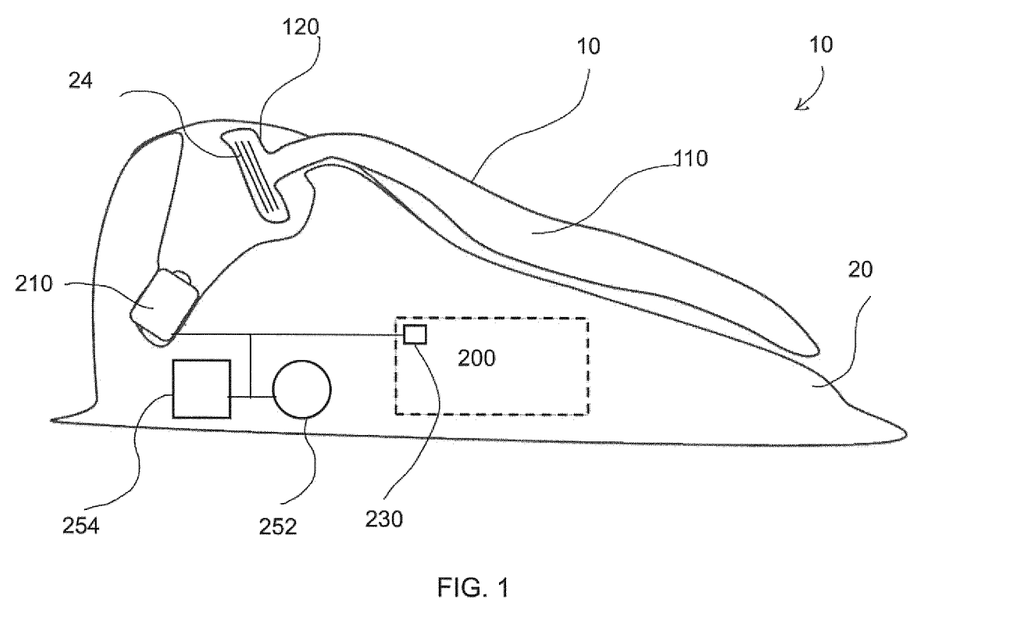
FIG. 1 is a side view of a shaving razor and base unit according to the present disclosure.

In one embodiment, sensing unit 210 shown in FIG. 1 functions on the principle of object detection using an IR sensor.

Figure 3:
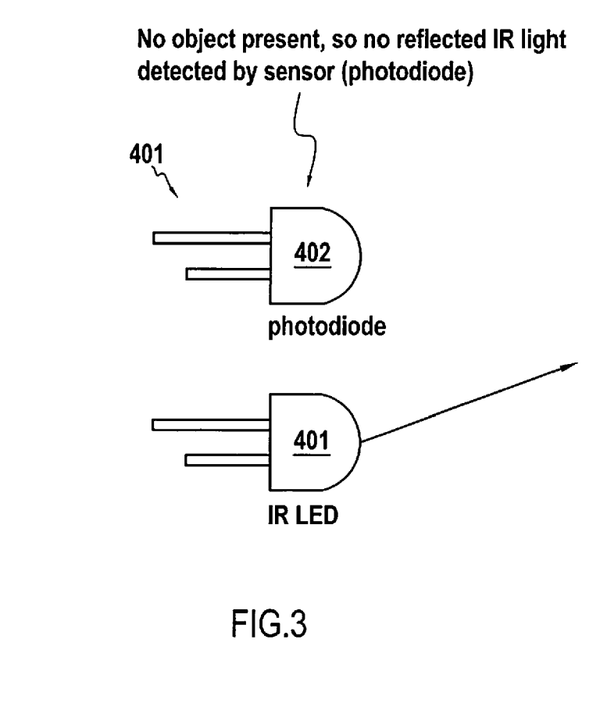
FIGS. 3 and 4 schematically illustrate varying light reflection depending on object darkness.
Figure 4:
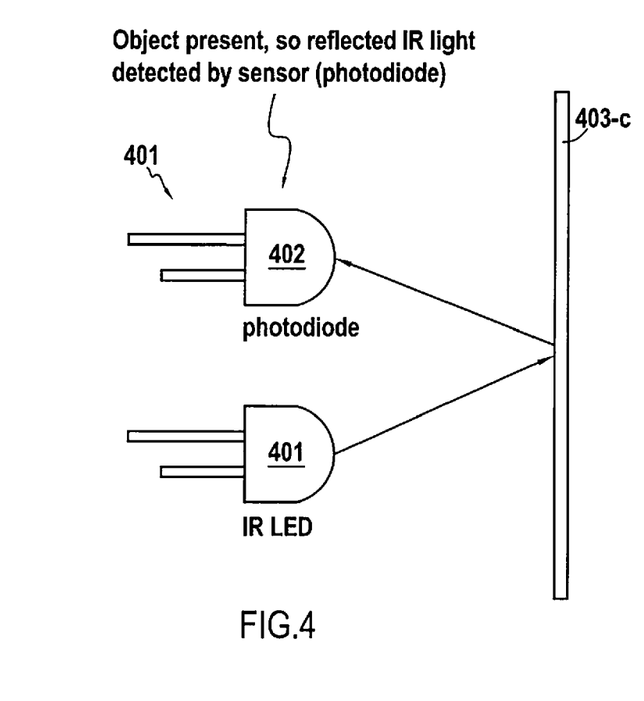

FIGS. 3 and 4 illustrate a principle of object detection using an infrared (IR) light detection sensor, IR sensor 400. As shown in FIGS. 3 and 4, IR sensor 400 can include an IR LED emitter, IR LED 401 for emitting IR light, and a photodiode 402 for detecting any reflected IR light. As shown in FIG. 3, when no object is present in the path of IR light emitted by IR LED 401, no reflected IR light is detected by photodiode 402. As shown in FIG. 4, when an object is present in the path of IR light emitted by IR LED 401, IR light reflected by the object 403-c is detected by photodiode 402.

Figure 5:
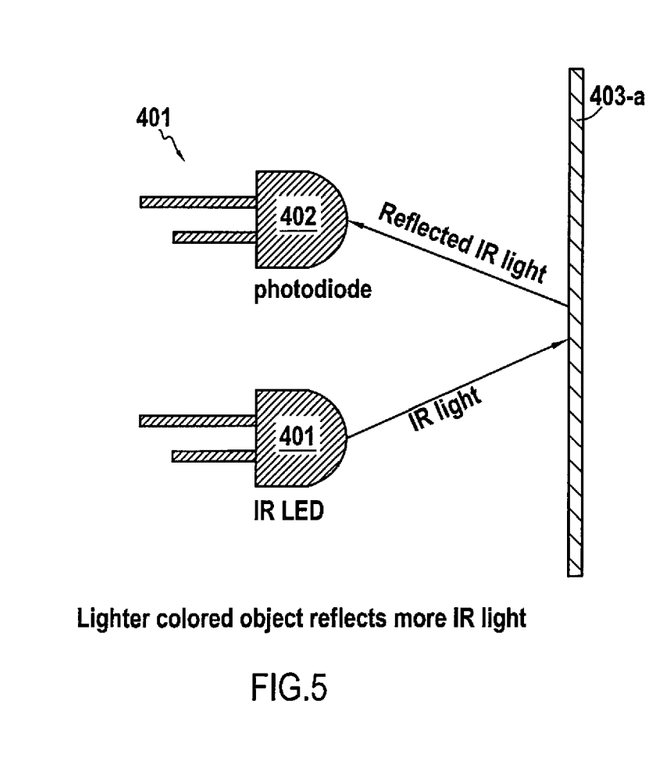
FIGS. 5 and 6 schematically illustrate the principle of object detection using IR sensor.
Figure 6:
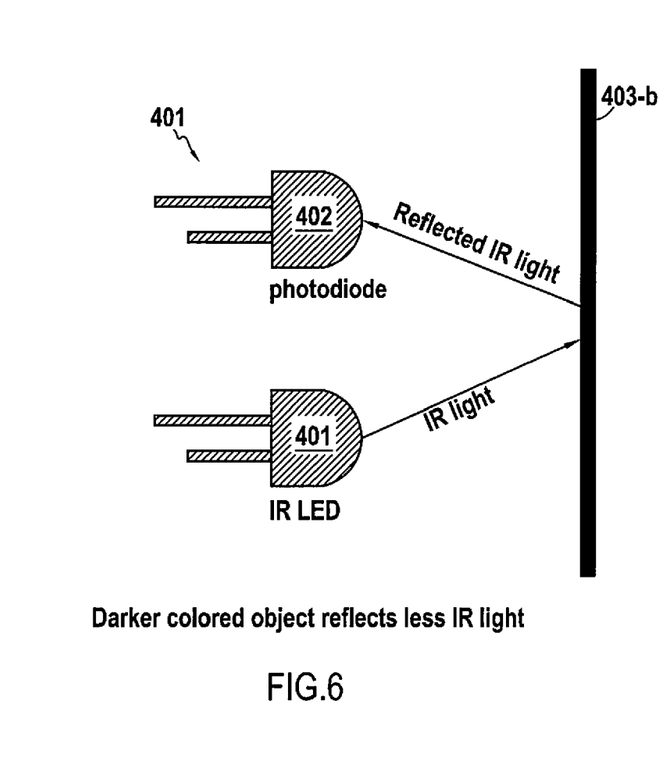

FIGS. 5 and 6 illustrate varying amounts of reflected IR light detected by IR sensor 400. As shown in FIGS. 5 and 6, IR light emitted by IR LED 401 is reflected by an object 403-a (FIG. 5) and object 403-b (FIG. 6), respectively, and the reflected IR light is detected by photodiode 402. Because the object 403-a shown in FIG. 5 is lighter in color (or darkness) in comparison to the object 403-b shown in FIG. 6, the amount of IR light reflected by the object 403-a is greater than the amount of IR light reflected by the object 403-b. Also, photodiode 402 detects the varying amounts of reflected IR light.

Figure 7:
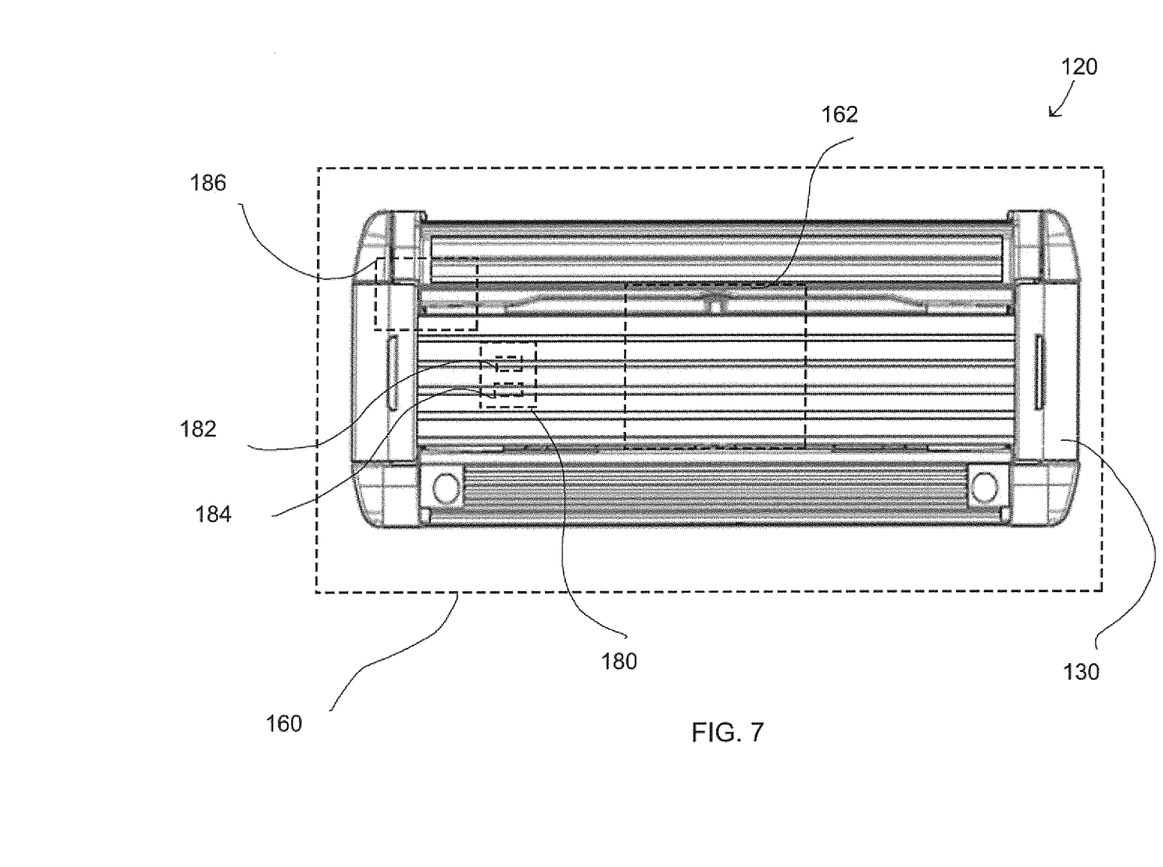
FIG. 7 is a front view of a cartridge and detection area.

A detection area 160 of cartridge 120 is shown in FIG. 7. In some embodiments, detection area 160 is at least as large as an area of cartridge 120 so that the entirety of cartridge 120 can be assessed. In certain aspects, detection area 160 can be large enough to accommodate different shapes and sized razors 100. In other aspects, detection area 160 can be one or more areas 162 smaller than detection area 160 distributed over top surface 130.

Figure 8:
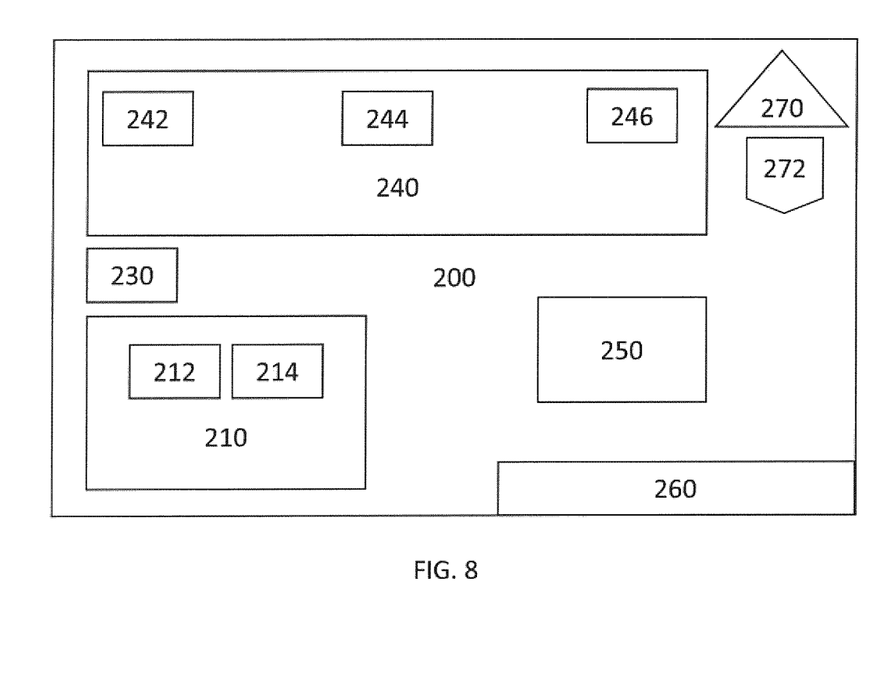
FIG. 8 is a schematic of a system architecture.

Referring to FIG. 8, circuitry 200 of base unit 20 includes the following exemplary components that are electrically and/or communicatively connected: a light sensor 212, which can be an IR light sensor of the type described in connection with FIGS. 3-6; an image sensor 214, which can be provided in addition to, or alternative to, light sensor 212; a notification unit 230, which can be configured to generate a visual (e.g., lights) and/or sound notification; a control unit 240, which can be configured to include a controller 242, a processor 244 and/or a memory 246; a power source 250 (e.g., battery or AC-DC converter); an interface unit 260, which can be configured as an interface for external power connection and/or external data connection; a transceiver unit 270 for wireless communication; and antennas 272. As shown in FIG. 1, base unit 20 further includes a light 252 and/or a speaker 254, both in operative communication with notification unit 230.

Referring to FIGS. 7 and 8, light sensor 212 is configured to measure an amount of light (e.g., IR light) reflected by a region surrounding blade 24, e.g., (i) region 186 between at least one blade 24 and cap 138 (or between the blade 24 and guard bar 136), and/or (ii) region 182 between two of the blades. By comparing the detected amount of light (e.g., IR light) reflected by one or more of regions 180, 182, 184, 186 to one or more predefined reference thresholds, one or more levels of debris accumulation can be detected by the sensor.

In some aspects, image sensor 214 is configured to detect an image of regions 180, 182, 184, 186, and by comparing the amount of debris accumulation shown in the detected image to one or more predefined reference levels of debris accumulation so that one or more levels of debris accumulation may be detected.

In other aspects, image sensor 214 is also configured to detect an image of regions 182 and 184, and by comparing the detected image to one or more predefined blade wear reference images, an amount of blade wear is assessed.

Control unit 240 receives and processes the information output from light sensor 212 and/or image sensor 214 to determine the level of debris accumulation in detection area 160, such as regions 180, 182, 184, 186. By way of a nonlimiting example, control unit 240 can compare the detected amount of light (e.g., IR light) reflected by region 182 to a reference threshold level of light. Control unit 240 can determine the level of debris accumulation based on an amount of deviation of the detected amount of reflected light from the reference threshold level(s) of reflected light.

For example, a first reference threshold level of reflected light can correspond to a completely debris-free condition of region 182. For the purposes of this nonlimiting example, it is assumed that a completely debris-free condition corresponds to a condition in which the light emitted by light sensor 212 is reflected by a light-color object (e.g., the condition depicted in FIG. 5). A second reference threshold level of reflected light can correspond to a condition of region 182 in which 33% of the region is filled with debris. A third reference threshold level of reflected light can correspond to a condition of region 182 in which 66% of the region 182 is filled with debris. A fourth reference threshold level of reflected light can correspond to a completely debris-filled condition of region 182. As the amount of debris in the region 182 increases, region 182 will become darker, and the amount of light reflected by region 182 will correspondingly decrease. This principle is illustrated in FIGS. 5 and 6. The detected amount of reflected light from the reference threshold level(s) of reflected light discussed above are illustrative. It will be understood that any number of reference threshold levels can be adopted and that the reference threshold levels are not limited to those discussed above.

Alternatively, or in addition, control unit 240 can analyze the detected image as detected by image sensor 214 of region 182. Also, by (i) comparing the amount of debris accumulation shown in the detected image to one or more predefined reference levels of debris accumulation and/or (ii) comparing the detected image to one or more predefined blade wear reference images, control unit 240 can determine (i) the level of debris accumulation based on an amount of deviation of the debris accumulation shown in the detected image to one or more predefined reference threshold level(s) of debris accumulation and/or (ii) an amount of blade wear beyond a reference threshold, respectively.

With respect to debris accumulation, a first reference threshold level can correspond to a completely debris-free condition of region 182 and/or region 186. A second reference threshold level can correspond to 33% of region 182 and/or region 186 filled with debris. A third reference threshold level can correspond to 66% of region 182 and/or region 186 filled with debris. A fourth reference threshold level can correspond to a completely debris-filled condition of region 182 and/or region 186. With respect to blade wear, a first reference threshold amount can correspond to a new or substantially new condition of blade 24 in region 182. A second reference threshold amount can correspond to an acceptable or operable amount of wear in region 182. A third reference threshold amount can correspond an undesirable amount of wear in 182 so that a replacement cartridge 120 should be used or ordered. In practice, blades 24 do not wear evenly. Accordingly, it is also envisioned that averages of two or more regions can be used to assess blade wear. It will be understood that these examples are not limiting.

Control unit 240 can provide information regarding the determined level of debris accumulation and/or amount of blade wear in a region surrounding blade 24 to notification unit 230, which in turn can generate output signal(s) corresponding to the determined level(s) of debris accumulation and/or amount of blade wear by at least one of (i) a light indication (e.g., using different colored LED lights) and/or (ii) an aural indication (e.g., using different sound levels and/or patterns).

Any one of the light and/or aural indication can signify, e.g., three different levels of debris accumulation: a first level corresponding to 0-33% debris accumulation of region 182 and/or region 184; a second level corresponding to 34-66% debris accumulation of region 182 and/or region 184; and a third level corresponding to 67-100% debris accumulation of region 182 and/or region 184. According to either the indication corresponding to the second level of debris accumulation or the indication corresponding to the third level of debris accumulation can be used as an signal or indication to the user of shaving cartridge 120 to rinse the cartridge. In alternative embodiments, a single ON/OFF "rinse" indication can be provided, either in addition to, or alternatively to, the above-described three different levels of debris accumulation, using the at least one of the light and aural indications. As such, a level of debris accumulation corresponding to 50-100% debris accumulation of region 182 and/or region 184 would be indicated by the "rinse" indication being turned ON. While certain examples are detailed, the disclosure is not limited to any of the aforementioned examples.

In other embodiments, each of the (i) a light indication (e.g., using different colored LED lights) and/or (ii) an aural indication (e.g., using different sound levels and/or patterns) can indicate, e.g., three different levels of blade wear: a first level corresponding to a new or substantially new condition of region 182; a second level corresponding to an acceptable or operable amount of blade wear in region 182; and a third level corresponding to an undesirable amount of blade wear in region 182.

According to alternative embodiments, a single ON/OFF "replace cartridge" indication can be provided, either in addition to, or alternatively to, the above-described three different amounts of blade wear, using the at least one of the light and aural indications. As such, the third level corresponding to an undesirable amount of blade wear in region 182 would be indicated by the "replace cartridge" indication being turned ON. Again, while certain examples are detailed, the disclosure is not limited to the examples detailed.

Control unit 240 can cumulatively collect and/or store (e.g., in memory 246) the information regarding the determined level of debris accumulation and/or blade wear to analyze and determine the rate of debris accumulation and/or blade wear. In addition, control unit 240 can analyze the rate of debris accumulation and/or blade wear in conjunction with data provided by a user or data from a database regarding particular skin type and/or hair properties, thereby enabling customized analysis and data collection of how an individual uses the razor 100.

In certain other aspects, as the rate of debris accumulation increases beyond a certain threshold, control unit 240 can further provide a "replace cartridge" or "replace razor" indication by at least one of (i) a light indication (e.g., using different colored LED lights) or (ii) an aural indication (e.g., using different sound levels and/or patterns).

Figure 9:
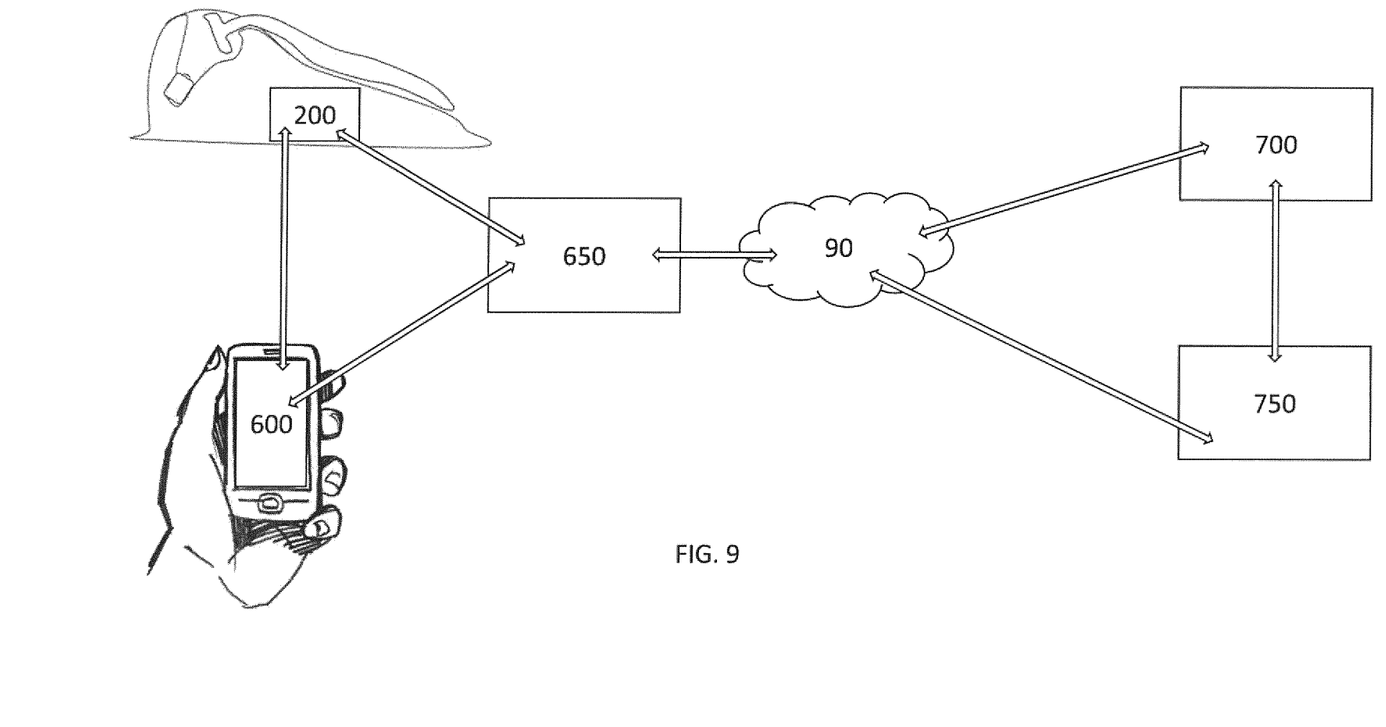
FIG. 9 is a schematic of the circuitry of the base unit in connection with an Internet of Things (IoT) architectural platform.

Information that is output from light sensor 212 and image sensor 214, and/or the information regarding the determined level of debris accumulation and/or blade wear in an area surrounding blade 24, can be transmitted (i) wirelessly via the transceiver unit 270 and antennas 272 or (ii) via a wired connection through an interface unit (not shown) to one or more devices, for example a device 600 or a server 700 that can be an internet of things (IOT) platform shown in FIG. 9. The one or more devices can perform some or all of the functionalities performed by control unit 240 as well as additional functionalities, e.g., further analysis and/or added service such as automated ordering of replacement cartridges via the Internet.

FIG. 9 illustrates an overview of an architectural platform on which an internet of things (IoT) enabled embodiment of the disclosure can be implemented. Circuitry 200 can be configured as a unit that is Internet Protocol (IP) capable by itself, and the information flow from and to base unit 20 is thereby routed through, e.g., a WiFi router serving as the IoT gateway 650. As an alternative, circuitry 200 of base unit 20 can be configured as a unit that is not Internet Protocol (IP) capable by itself, in which case IoT gateway 650 performs functions involved in communicating via the Internet/cloud, e.g., translating protocols, encrypting, processing, managing data, and the like. According to other embodiments, circuitry 200 of base unit 20 can be configured to communicate with device 600 that connects to network 90.

Other communication technologies include cellular, satellite, Bluetooth, low-power wide-area networks (LPWAN), or connecting directly to the internet via ethernet, which examples are not limiting. The information can be routed from the IoT gateway 650 to a cartridge vendor platform 750 via a network 90 and an IoT platform 700. Although the IoT platform 700 is shown separately from the network 90, network 90 can encompass IoT platform 700. As used in this disclosure, the term "network" encompasses the Internet and the associated connection infrastructure.

Figure 10:
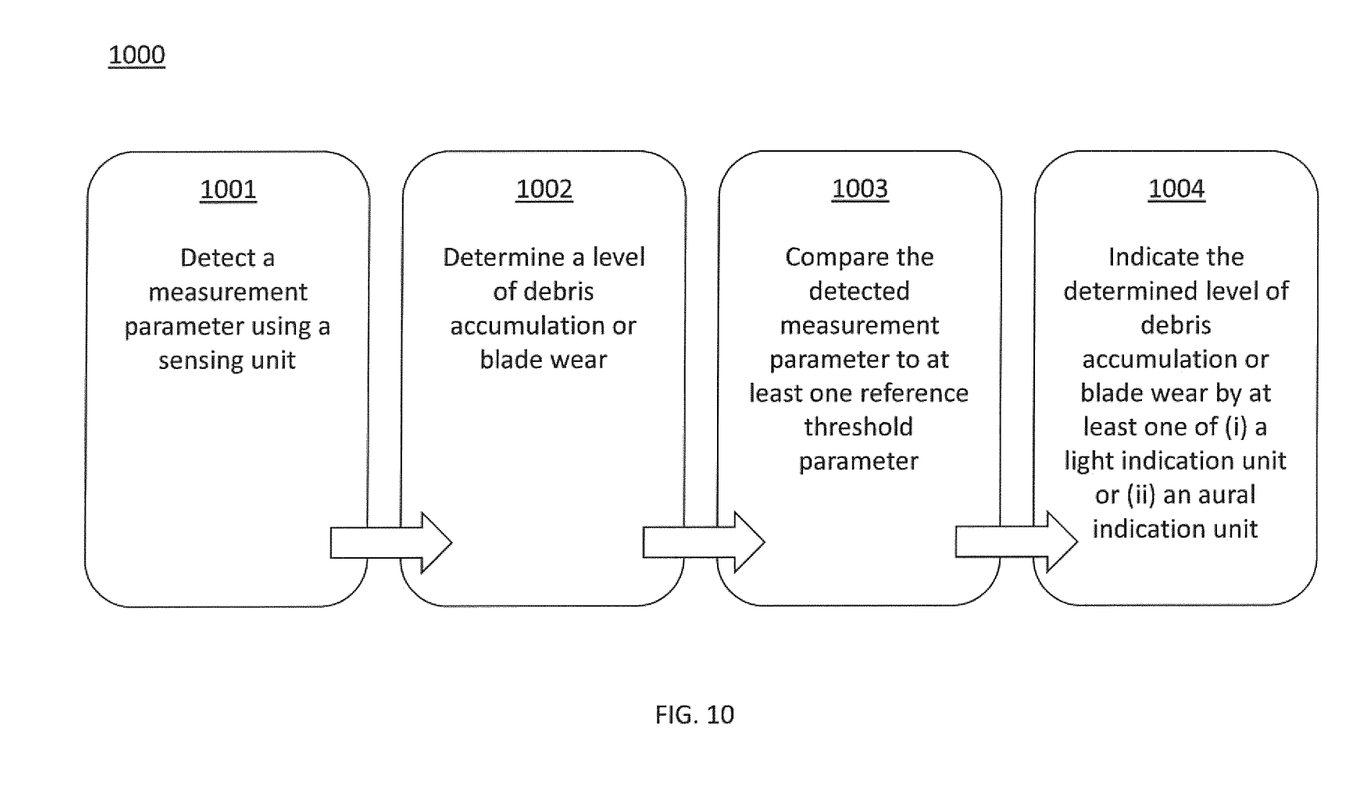
FIG. 10 is a logic flow for assessing and alerting a user of debris accumulation and/or blade wear.

FIG. 10 illustrates a logic flow 1000 used by control unit 240. At block 1001, a measurement parameter is detected using a sensing unit 210 (e.g., light sensor 212 and/or image sensor 214). The measurement parameter includes at least one of (i) an amount of light (e.g., IR light) reflected from at least one area (e.g., region 182 and/or region 184), and (ii) an image of the at least one area (e.g., region 182 and/or region 184). At block 1002, a level of debris accumulation and/or blade wear in the at least one area (e.g., region 182 and/or region 184) is determined, e.g., by control unit 240. At block 1003, the detected measurement parameter based on an amount of deviation of the detected measurement parameter is compared to from the at least one reference threshold parameter. At block 1004, there is an indication or output information regarding the determined level of debris accumulation and/or blade wear is provided by a notification unit (e.g., 230) including at least one of (i) a light indication unit or (ii) an aural indication unit.

Alternatively, or in addition, at block 1004 output information regarding the determined level of debris accumulation and/or blade wear is provided to device 600.

Alternatively, or in addition, at block 1004 output information regarding the determined level of debris accumulation and/or blade wear is provided to IoT platform 700 or cartridge vendor platform 750 for providing advice through an interactive device application or for ordering new cartridges. However, the embodiments are not limited to the example configurations detailed above.

The functionality of logic flow 1000 can be performed by (i) a single computing entity, e.g., base unit 20 or device 600, or (ii) in a distributed manner. In the latter case, portions of the structure and/or operations of logic flow 1000 are performed across multiple computing platforms and/or entities using a distributed system architecture, e.g., a master-slave architecture, a client-server architecture, a peer-to-peer architecture, a shared database architecture, and similar platforms and/or entities. Embodiments of the disclosure are not limited to the flow logic detailed herein.

Device 600 has internal circuitry for communication with base unit 20 and/or IoT platform 700. Device 600 can be, e.g., a handheld personal computer such as, for example, a smartphone or tablet device, a computer, a network appliance, a web appliance, consumer electronics, programmable consumer electronics, game devices, television, digital television, set top box, wireless access point, base station, subscriber station, mobile subscriber center, radio network controller, router, hub, gateway, and other similar devices.

When a certain structural element is described as "is connected to", "is coupled to", or "is in contact with" a second structural element, it should be interpreted that the second structural element can "be connected to", "be coupled to", or "be in contact with" another structural element, as well as that the certain structural element is directly connected to or is in direct contact with yet another structural element.

It should be noted that the terms "first", "second", and the like can be used herein to modify various elements. These modifiers do not imply a spatial, sequential or hierarchical order to the modified elements unless specifically stated.

As used herein, the terms "a" and "an" mean "one or more" unless specifically indicated otherwise.

As used herein, the term "substantially" means the complete or nearly complete extent or degree of an action, characteristic, property, state, structure, item, or result. For example, an object that is "substantially" enclosed means that the object is either completely enclosed or nearly completely enclosed. The exact allowable degree of deviation from absolute completeness can in some cases depend on the specific context. However, generally, the nearness of completion will be to have the same overall result as if absolute and total completion were obtained.

As used herein, the term "about" is used to provide flexibility to a numerical range endpoint by providing that a given value can be "a little above" or "a little below" the endpoint. Further, where a numerical range is provided, the range is intended to include any and all numbers within the numerical range, including the end points of the range.

While the present disclosure has been described with reference to one or more exemplary embodiments, it will be understood by those skilled in the art, that various changes can be made, and equivalents can be substituted for elements thereof without departing from the scope of the present disclosure. In addition, many modifications can be made to adapt a particular situation or material to the teachings of the present disclosure without departing from the scope thereof. Therefore, it is intended that the present disclosure will not be limited to the particular embodiments disclosed herein, but that the disclosure will include all aspects falling within the scope of a fair reading of appended claims.

The invention claimed is:

1. A method for determining the condition of a cartridge comprising:
    providing an apparatus for a shaving razor comprising:
        a base unit for supporting the shaving razor;
        one or more sensors in the base unit disposed to face the cartridge; and
        a processor and circuitry in operative communication with the one or more sensors.
    determining, via the processor, accumulation of debris in the cartridge and/or wear of the blades;
    providing, from the base unit, directly or via a handheld personal computer, a visual or aural alert to a user regarding the determined accumulation of debris in the cartridge and/or wear of the blades;
    detecting a measurement parameter using the one or more sensors, wherein the measurement parameter includes at least one of (i) an amount of light reflected from at least one area or (ii) an image of the at least one area;
    determining a level of debris accumulation or blade wear;
    comparing the determined level of debris accumulation or blade wear to at least one reference threshold parameter; and
    indicating the determined level of debris accumulation or blade wear by a light indication unit and/or an aural indication unit.

2. The method of claim 1, wherein an output information regarding the determined level of debris accumulation and/or blade wear is provided to a handheld personal computer.

3. The method of claim 1, wherein an output information regarding the determined level of debris accumulation and/or blade wear is provided to an Internet of things platform or a cartridge vendor platform for providing advice through an interactive application or for ordering new cartridges.

4. An apparatus for a shaving razor having a cartridge containing one or more blades, the apparatus comprising:
    a base unit for supporting the shaving razor;
    one or more sensors in the base unit disposed to face the cartridge,
    wherein one or more of the sensors is a light sensor; and
    a processor and circuitry in operative communication with the one or more sensors,
    wherein the processor is configured to determine accumulation of debris in the cartridge and/or wear of the blades, and
    wherein the base unit, directly or via a handheld personal computer, provides a visual or aural alert to a user regarding the determined accumulation of debris in the cartridge and/or wear of the blades.

5. The apparatus of claim 4, wherein one or more of the sensors is an infrared light sensor.

6. The apparatus of claim 4, wherein the light sensor is configured to measure an amount of light reflected by a region surrounding the blades.

7. The apparatus of claim 6, wherein the processor is configured to compare the amount of reflected light with one or more predetermined reference thresholds.

8. The apparatus of claim 7, wherein the base unit is configured to trigger the alert if the processor determines that the amount of reflected light meets one or more of the predetermined reference thresholds.

9. The apparatus of claim 4, wherein the processor is configured to store information on the determined level of debris accumulation and/or blade wear and determine a rate of debris accumulation and/or blade wear.

10. The apparatus of claim 4, wherein the base unit comprises a transceiver unit and antennas.

11. The apparatus of claim 10, where in the transceiver unit and antennas are configured to transmit and receive information on the accumulation of debris in the cartridge and/or wear of the blades.

12. The apparatus of claim 10, wherein the apparatus is an Internet Protocol (IP) capable system, and the transceiver unit is configured to directly interface with an Internet gateway connected to the Internet to transmit information on the accumulation of debris in the cartridge and/or wear of the blades.

13. The apparatus of claim 11, wherein the apparatus is an Internet Protocol (IP) capable system, and the transceiver unit is configured to directly interface with an Internet gateway connected to the Internet to transmit information on the accumulation of debris in the cartridge and/or wear of the blades.

14. An apparatus for a shaving razor having a cartridge containing one or more blades, the apparatus comprising:
- a base unit for supporting the shaving razor;
- one or more sensors in the base unit disposed to face the cartridge,
- wherein one or more of the sensors is an image sensor; and
- a processor and circuitry in operative communication with the one or more sensors,
- wherein the processor is configured to determine accumulation of debris in the cartridge and/or wear of the blades, and
- wherein the base unit, directly or via a handheld personal computer, provides a visual or aural alert to a user regarding the determined accumulation of debris in the cartridge and/or wear of the blades.

15. The apparatus of claim 14, wherein the image sensor is configured to detect an image of a region surrounding the blades.

16. The apparatus of claim 15, wherein the processor is configured to compare the detected image of the region surrounding the blades with one or more predefined blade wear reference images.

17. The apparatus of claim 16, wherein the base unit is configured to trigger the alert if the processor determines that the detected image corresponds to one or more predefined blade wear reference images.

* * * * *